Oct. 19, 1937. D. M. PALMER 2,096,289
MACHINE DRIVE ARRANGEMENT
Filed March 8, 1937
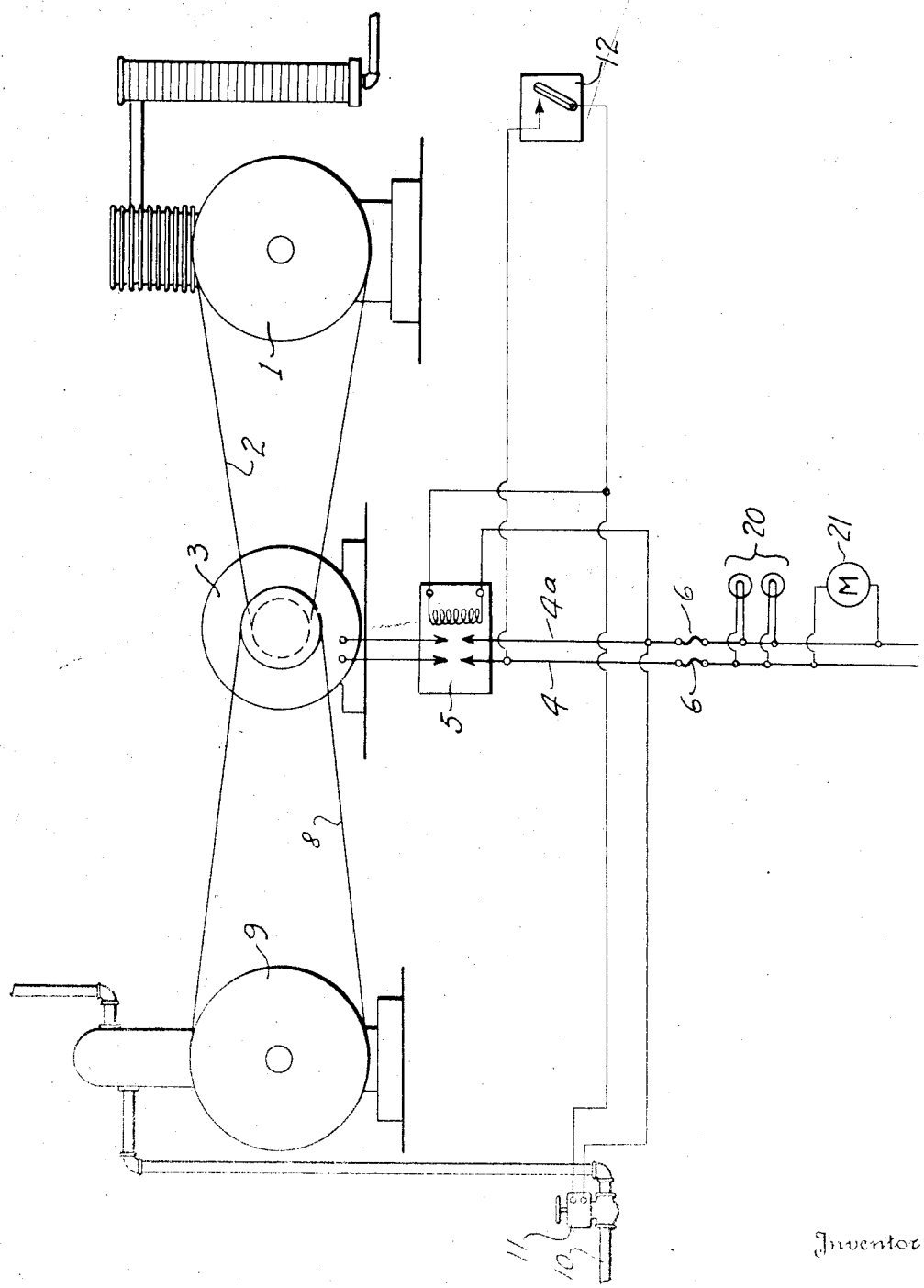
Inventor
Delos M. Palmer
Owen & Owen
Attorneys Patented Oct. 19, 1937

2,096,289

UNITED STATES PATENT OFFICE 2,096,289

MACHINE DRIVE ARRANGEMENT

Delos M. Palmer, Toledo, Ohio, assignor of one-third to Ralph S. Wenner and one-third to James T. McMahon, both of Toledo, Ohio Application March 8, 1937, Serial No. 129,771

2 Claims. (Cl. 290—31)

This invention relates to an arrangement for driving machines, and is particularly directed to an apparatus in which an induction type electrical machine is employed.

The primary object of the invention is the provision of a driving arrangement which is economical to operate, simple to maintain, which is completely automatic, and which in combination possesses certain desirable characteristics not found in its component parts.

Other objects and advantages of the invention will become apparent from the following specification taken in connection with the accompanying drawing, which diagrammatically illustrates a typical installation.

In the drawing, 1 designates the mechanical load of the driving arrangement, in this instance a compressor of a refrigerating unit, which is connected by a belt 2 to an induction machine 3. The induction machine 3 is adapted to be connected to alternating current supply lines 4 and 4ª by a suitable magnetically operated switch 5. The induction machine circuit is fused as at 6.

The induction machine 3 is further connected by a belt 8 to an internal combustion engine 9, having a fuel supply line 10 controlled by a spring closed, magnetically opened valve 11. The fuel employed is preferably gas, although any desirable medium may be used.

In the connections shown, the motor circuit control switch 5 and the fuel supply valve 11 are connected to a thermally operated circuit maker 12 exposed to the space refrigerated by the compressor unit 1 and preferably having its source of electrical energy interlocked with the supply lines 4 and 4ª. Thus, when the thermally responsive element is moved by reason of the temperature of the refrigerated space reaching a predetermined point, the control circuit is closed and the motor switch 5 and fuel valve 11 are operated.

When an installation of the above character is made, for instance, in a store where the compressor is used as a part of an air conditioning system, other electric current consuming elements such as lights 20 and motor 21 are connected to the supply lines 4 and 4ª and constitute an electric load.

In operation, when the control circuits are closed as above-described, the induction machine 3 operates first as a motor, drawing current from supply lines 4 and 4ª. Being connected to the induction machine by a belt 8, the internal combustion engine 9 is cranked and will start. As the engine 9 comes up to its governed speed it will pick up the load from the induction machine and in addition to driving the load will drive the machine 3 at a speed corresponding to, or faster than, the synchronous speed of the latter, depending on the governed speed of the engine.

If the speed of rotation of the induction machine corresponds to its synchronous speed, the engine now drives the compressor 1 and the induction machine merely floats on the line, consuming only its excitation current. Since the cost of fuel for the internal combustion engine is but a small fraction of the cost of electric power which would be consumed by the operation of the induction machine as a motor, a considerable saving in the cost of operating the compressor load will be effected. It will further be appreciated that the internal combustion engine operates at a constant load at all times so that the size of the engine may be chosen to result in maximum efficiency of operation.

If the governed speed of the engine 9 is such that it drives the induction machine 3 faster than synchronous speed, the latter will operate as an induction generator. Numerous advantages accrue from such operation. In the first place, power is generated at a voltage and frequency determined by the supply lines, so that it is suitable for use with any other A. C. machines which may be connected to the machine. The power generated by the induction generator will be utilized by the remaining current consuming devices 20 and 21 on the premises, however, before any actual reversal of flow into the main supply lines takes place.

In the second place the induction generator acts as a speed control for the engine 9 since it becomes part of the engine load and its loading effect increases tremendously with a slight increase in speed. If the generator output should by any chance exceed the capacity of the fuses 6, these latter will fail and no current will be supplied to the fuel control valve 11, so that the fuel supplied to the engine will be cut off. However, if the engine 9 is properly chosen, its speed will be controlled and reduced before the generator output reaches this maximum point.

In addition to controlling the maximum speed of the engine, the induction machine 3 also serves to prevent a reduction in speed at which the compressor is driven. It will be seen that if the engine 9 should fail to operate at a sufficiently high speed or it is unable to carry the mechanical load, the induction machine 3 will pick up the load and act as a motor, drawing current from supply lines 4 and 4ª and driving the compressor. It will be appreciated that this shift in the source of power for the compressor has been accomplished without need for any control devices whatever.

While the invention has been described in connection with a compressor load, it should be expressly understood that various other machines may be economically driven by the same arrangement, so that the invention should be construed as properly including all devices which fall within the scope of the appended claims.

Having thus described my invention, what I claim as new, and desire to secure by United States Letters Patent, is:

1. A driving arrangement for a system having a mechanical and electrical load including, an induction machine mechanically coupled to the mechanical load and electrically coupled to the electrical load, an alternating current supply line connected to said induction machine and said electrical load, a mechanical prime mover adapted to drive said mechanical load and connected to drive said induction machine above its synchronous speed and thereby operate the same as a generator to absorb said electrical load, and control means for said mechanical prime mover interlocked with said alternating current supply line operable to shut down said prime mover in event of failure of said alternating current supply.

2. A driving arrangement for a system having a mechanical and electrical load including, an induction machine mechanically coupled to the mechanical load and electrically coupled to the electrical load, an alternating current supply line connected to said induction machine and said electrical load, and an internal combustion engine delivering a power output greater than said induction machine and adapted to drive said mechanical load and to drive said induction machine above its synchronous speed and thereby operate the same as a generator to absorb said electrical load.

DELOS M. PALMER.